United States Patent [19]

Komatsu

[11] Patent Number: 4,524,293
[45] Date of Patent: Jun. 18, 1985

[54] 4-POLE ELECTRIC MOTOR

[76] Inventor: Fumito Komatsu, 69-1632-12, Nomura Aza, Ooaza Hirooka, Shioziri-shi, Japan

[21] Appl. No.: 431,422

[22] Filed: Sep. 30, 1982

[30] Foreign Application Priority Data

Oct. 6, 1981 [JP] Japan ................................. 56-159709

[51] Int. Cl.³ ............................................. H02K 37/00
[52] U.S. Cl. ................................... 310/46; 310/67 R; 310/154; 310/156
[58] Field of Search ................... 310/46, 67, 68, 156, 310/154, 152, 192, 237, 49

[56] References Cited

U.S. PATENT DOCUMENTS

| 2,469,834 | 5/1949 | Maerz | 310/46 X |
| 3,244,917 | 4/1966 | Gute | 310/237 X |
| 3,760,207 | 9/1973 | Abraham et al. | 310/67 X |
| 3,873,897 | 3/1975 | Müller | 310/192 X |
| 3,961,211 | 6/1976 | Verques | 310/46 X |
| 4,217,509 | 8/1980 | Sudler | 310/49 |
| 4,340,828 | 7/1982 | Sudler et al. | 310/49 |

Primary Examiner—Donovan F. Duggan
Attorney, Agent, or Firm—Jordan and Hamburg

[57] ABSTRACT

A 4-pole armature is accommodated with in a 4-pole permanent-magnet ring, either the ring or armature serving as the rotor. The core of the armature is cross-shaped, a set of two members of the core in straight orientation has windings applied on each member with opposite winding directions, and the cross-shaped core is provided at each winding of four core ends with separable back-up cores extending in the rotational direction of the armature or in the direction opposite to the rotational direction of the ring. A device for converting armature polarity is provided which alternates the direction of electric current for the armature every 90° rotation of the rotor.

10 Claims, 7 Drawing Figures

4-POLE ELECTRIC MOTOR

BACKGROUND OF THE INVENTION

The present invention relates to 4-pole electric motors, more particularly to 4-pole DC motors, wherein separable back-up cores are provided at the ends of a cross-shaped core of the armature, resulting in elimination of the dead point for start-up, promotion of the efficiency of coil winding, and increase in quantity of windings applicable accompanied with enhanced power efficiency.

In motors which have a permanent-magnet ring surrounding an armature with electromagnetic poles having coil-wound cores, with either the armature or the ring serving as the rotor with the other as the stator, turning off the current to the electromagnetic poles will stop the rotor stably at the position of lowest magnetic resistance, depending on the relative positional relation between rotor and stator.

In restarting the motor with the rotor in such a position, the so-called start-up dead point is encountered where the ring poles and electromagnetic poles are in such a positional relation that there are diametrical N—N and S—S orientations with respect to the center of rotary shaft, which is incapable of generating rotary force.

A means for avoiding the start-up dead point has been adopted in which the core itself is deformed in shape. However, this means has disadvantages that projections, etc. disturb the winding job and that the quantity of coil windings on the armature is reduced to lower the power efficiency.

SUMMARY OF THE INVENTION

The major object of the present invention is to provide 4-pole motors which, when supplied with electric current, are ensured to start up with no influence of a start-up dead point.

Another object is to provide 4-pole motors which facilitate coil winding on the core, with the maximum amount of windings for the available space.

Another object is to provide 4-pole motors which are small in size and high in power efficiency.

The final object is to provide 4-pole motors which, equipped with a commutator release device, may be connected to an AC power supply as synchronous autostart-capable motors.

BRIEF DESCRIPTION OF THE DRAWINGS

FIG. 3 relates to the present invention and FIG. 4 is for a 2-pole 3-slot structure.

DETAILED DESCRIPTION OF THE INVENTION

Figure 1:
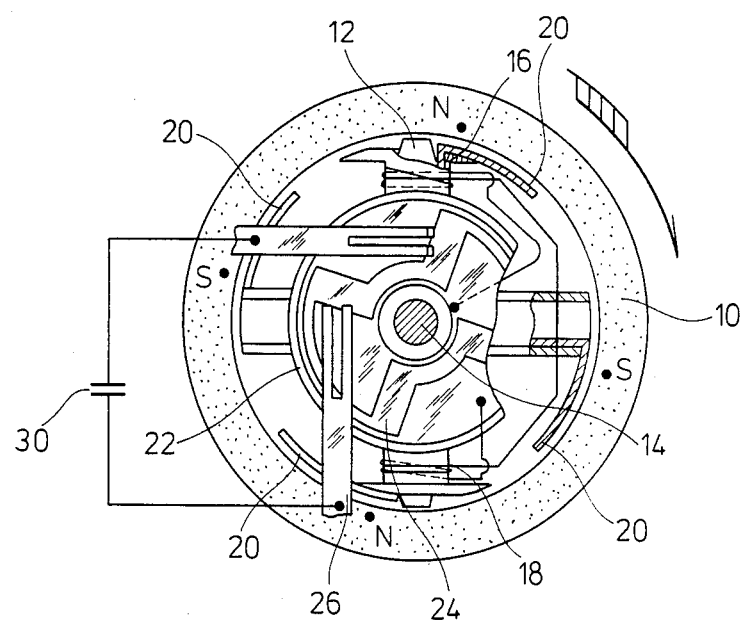
FIG. 1 shows a detailed partially sectional and partially broken away view of one embodiment of the present invention transverse to the axis thereof.

The embodiment of the present invention will be described in detail by referring to the drawings for suitable examples.

In FIG. 1, 10 is the stator composed of a permanent-magnet ring having 4 poles equally magnetized.

12 is the armature designed to rotate in the arrow-indicated direction or clockwise around the rotary shaft 14. The cross-shaped core 16 has one of its two magnetic paths wound with the armature coil 18; the other magnetic path serves merely as magnetic poles. Armature coil 18 has windings applied on the straight core section of core 16, shown vertical in the figure, in such a way that the upper and lower parts with respect to rotary shaft 14 are to have windings in opposite directions with each other.

20 is a back-up core extending in an arc in the rotational direction of armature 12.

22 is a commutator composed of slider 24 and brush 26. Slider 24 is provided on a disk, vertical to and rotatable in unison with rotary shaft 24, so as to alternate the poles of armature 12 between N and S every 90° rotation of the rotary shaft.

Figure 2:
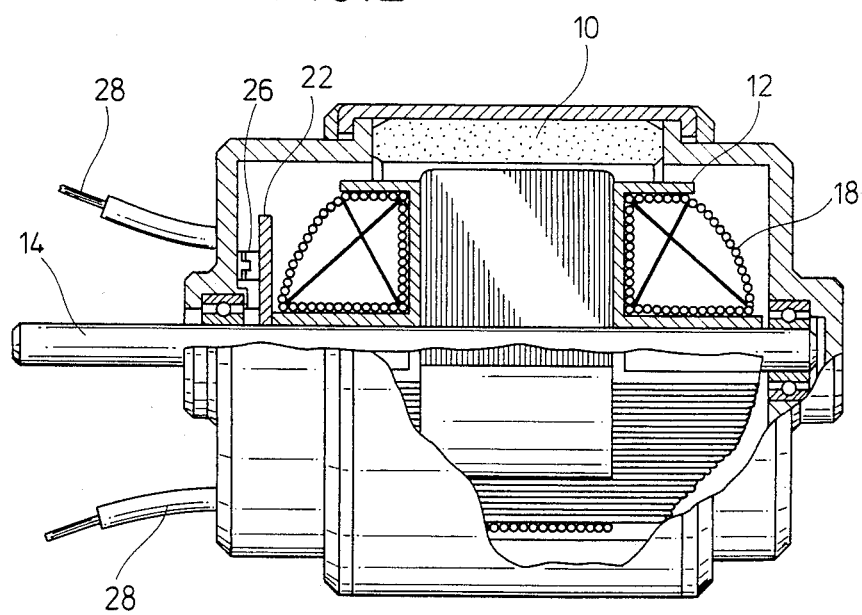
FIG. 2 shows a partially broken away side view in elevation of the embodiment as shown in FIG. 1.

Brush 26 is connected to a DC power supply by lead wire 28 shown in FIG. 2. A condenser 30 may be connected between brushes 26 to prevent sparks from generating noises.

With the above structure, while armature 12 is rotating commutator 22 alternates the poles of armature 12 so as to energize the rotation of armature 12, when the power is turned off armature 12 is stopped with its core 16 at a position corresponding to the pole of stator 10, and at the time of restart the electric current flow has such an effect on back-up core 20 as to shift the magnetic path in the rotational direction of armature 12, resulting in start-up with displaced dead point.

The commutator in the above description is composed of brushes and a rotary disk provided vertical to the rotary shaft, but use may be made of a commutator in a sleeve along the rotary shaft or any other conventional construction. In the case of contactless system utilizing Hall elements, etc. for positional detection, the permanent-magnetic ring may be used as the rotor with the armature as the stator. When the ring is used as the rotor, back-up core 20 on core 16 of armature 12 as the stator is to be extended in the direction opposite to the rotational direction of the ring.

Figure 3:
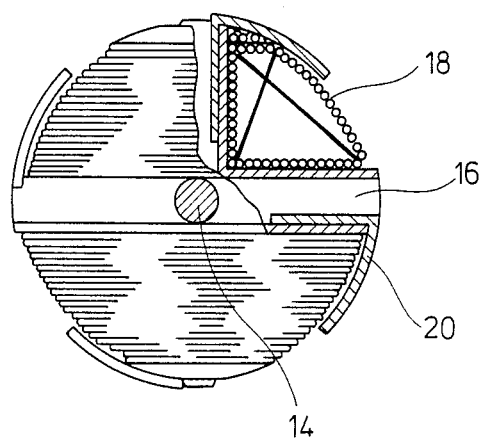
FIGS. 3 and 4 show partially cut-away views of armatures.
Figure 4:
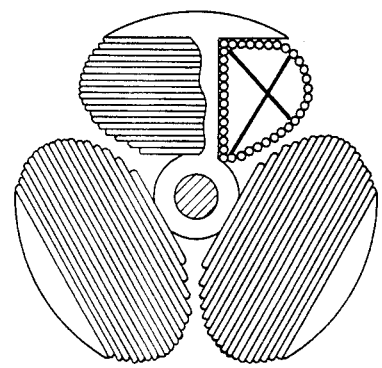
Figure 5:
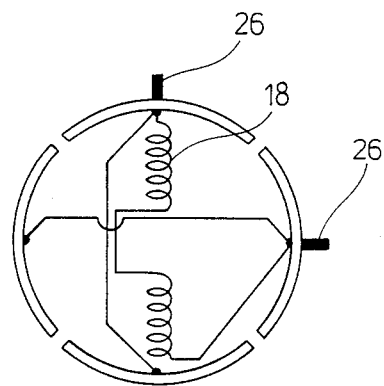
FIGS. 5 and 6 are schematic representations of the armatures shown in FIG. 3.
Figure 6:
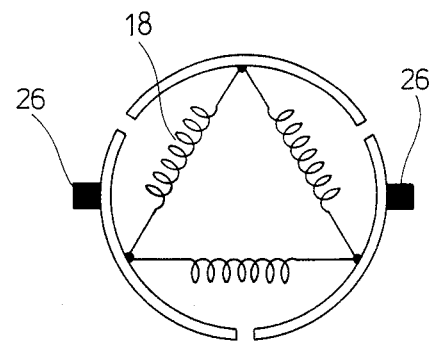

The present invention is to be applied specifically to 4-pole motors. The reason for this restriction is as follows. As seen from FIG. 3, the 4-pole armature of FIG. 3 is close to a sphere in shape as compared with the 2-pole 3-slot armature of FIG. 4 and therefore may accommodate more coil windings, and in addition, as seen from FIGS. 5 and 6, the 4-pole armature of FIG. 5 has its entire coil always in action and therefore may give higher power efficiency than the 2-pole 3-slot armature of FIG. 6 which has a combination of two series coils in parallel with the other coil.

The back-up core 20 is attached to the core after the armature coil has been wound on the core, the back up cores 20 being separable from the cores 16. Thus, the back-up core will by no means disturb the process of coil winding.

Figure 7:
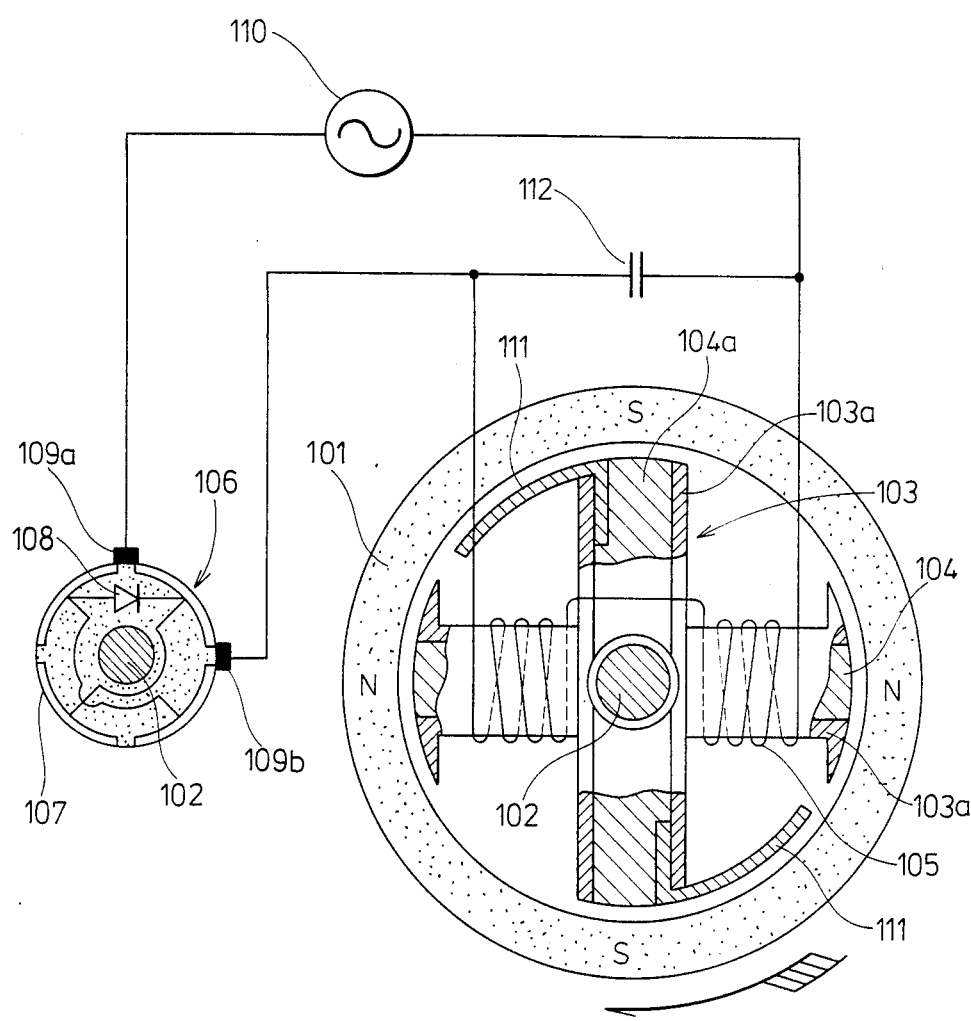
FIG. 7 shows a semidiagrammatical vertical sectional view of an AC motor according to the present invention.

FIG. 7 illustrates the principle of applying the present invention to construction of AC single-phase 4-pole motors.

101 is a permanent-magnet rotor with 4 inside-magnetized poles, capable of rotation in unison with rotary shaft 102. 103 is a fixed armature containing rotary shaft 102 at its center and employing the cross-shaped bobbin 103a as its frame.

104 is a field core, whose components are applied from one side on bobbin 103a of fixed armature 103 in a cross with rotary shaft 102 as the center.

105 is a field coil. Since the two poles or rotor 101 to come into simultaneous contact with the poles on fixed armature 103 are of the same polarity such as N and N, the two wings of fixed core 104 diametrically across bobbin 103a are applied with windings in directions opposite to each other with respect to rotary shaft 102 as the center so as to generate poles of the same polarity.

Of the field cores 104 applied on bobbin 103a, those field cores 104 with no field coils 105 applied are provided, as in the above example application, at their ends with back-up cores 111 extending in the direction opposite to the arrow-indicated rotational direction as a means for eliminating the start-up dead point. Back-up cores 111 may, of course, be provided on each of the four ends of field cores 104.

106 is a slider, which rotates in unison with rotary shaft 102 and is provided with four slider pieces 107 on an envelope over rotary shaft 102; these slider pieces are connected via rectifying piece 108 so as to arrange a conduction in the order + − + − in the circumferential direction.

109a and 109b are brushes, one in sliding contact with the (+) sliding piece 107 and the other with the (−) sliding piece 107. Brush 109a is connected to coil 105 via AC power supply source 110 and brush 109b directly to coil 105.

112 is a condenser, which advances the phase of electric current to promote output. This condenser, though applied in parallel in this example, may be applied in series.

With this structure, power supply 110 passes current via the sliding piece 107 in the direction from brush 109a to 109b, causing rotor 101 to begin to rotate until there has been established another pole correspondence between fixed armature 103 and rotor 101, when slider 106 also has rotated the same degrees of rotation, reversing the direction of the current through sliding piece 107 with brushes 109a and 109b in contact, i.e., passing current from brush 109b to 109a. The reversal will change the poles of fixed armature 103, with resulting acceleration of the rotation of rotor 101.

The motor described above may be modified into a synchronous motor using the same AC power supply if such a device as a centrifugal control device is used so that, when the rotation of rotor 101 has become approximately synchronous with the AC cycle, slider 106 is allowed to thrust in the rotational direction of rotary shaft 102 with resultant short-circuiting between brushes 109a and 109b. It may also be modified into a synchronous motor capable of autostart if springs, etc. are used so that, when rotor 101 is slowed down for stopping, slider 106 may be returned to its original position with a reset to the start-up-enabling condition.

Field core 104a, which is vertical to field core 104 through rotary shaft 102, may be made available so as to be opposite in pole polarity to field core 104, in correspondence with the poles of rotor 101.

As described above, the present invention provides the advantages that the use of back-up core 20 eliminates the dead point against start-up, thereby securing start-up; that back-up core 20 may be attached without disturbing the process of winding application since it is to be applied after the field core has been wound; that the field coil may be maximized in quantity of windings within a given space; that, since the armature is accommodated within the permanent-magnet ring with resulting suppression on leaking magnetic flux, such a high power efficiency is obtainable as to make it possible to reduce the size and thickness; that AC motors, when equipped with a release device for converting the electromagnetic poles in polarity, may be modified into synchronous motors capable of autostart, and so on.

The present invention has been described in detail by using suitable application examples. It goes without saying that the present invention is not restricted to these application examples, but that a number of modifications are applicable within the scope of the spirit of the invention.

I claim:

1. A 4-pole motor comprising a 4-pole armature within a 4-pole permanent-magnet ring, either the armature or ring serving as the rotor with the other serving as the stator, the electromagnetic-pole core of the armature being cross-shaped and having a rotary shaft at its center to define four core members extending radially outwardly of the shaft, one diametrically opposed pair of said core members having windings wound in the opposite directions with respect to each core member, back-up cores on the ends of cross-shaped cores of at least one pair of diametrically opposite core members, said back-up cores being separable from the respective core members, the back-up cores extending in the rotational direction of the armature when the armature is used as a rotor or in the direction opposite to the rotational direction of the ring when the ring is used as a rotor, and means for alternating the polarity of the electromagnetic poles every time the rotary shaft rotating in unison with the rotor rotates 90°.

2. A motor as claimed in claim 1 wherein a conversion device utilizing Hall elements for positional detection is used as the means for alternating the polarity of the electromagnetic poles.

3. A motor as claimed in claim 1 wherein a commutator is used as the means for alternating the polarity of the electromagnetic poles.

4. A 4-pole motor as claimed in claim 3 wherein the commutator is comprised of a slider and brushes, the slider being provided on a disk which is normal to and rotable in unison with the rotary shaft, the brushes being connected to a DC power supply.

5. A 4-pole motor as claimed in claim 1 or 3 wherein the 4-pole armature is fixed with pole correspondence within a rotary ring made of 4-pole permanent magnet, the rotary shaft for the rotary ring being inserted into the center of the electromagnetic-pole core of the armature, and said back-up cores are attached at the ends of the cross-shaped core extending in the direction opposite to the rotational direction of the ring.

6. A 4-pole motor as claimed in claim 1 or 3 wherein the 4-pole armature is accommodated with pole correspondence within a fixed ring made of 4-pole permanent magnet, the rotary shaft being provided at the center of the electromagnetic-pole core of the armature, and said back-up cores are attached at the ends of the cross-shaped core extending in the rotational direction of the armature.

7. A 4-pole motor as claimed in claim 1 or 3 wherein the commutator is comprised of a slider and brushes the slider being divided into 4 slider pieces provided in an envelope over the rotary shaft, the slider pieces being connected so that the set of slider pieces is made conductive in the circumferential direction in the order $+-+-$ via a rectifier, and the brushes being connected to a DC power supply.

8. A 4-pole motor as claimed in claim 1 or 3 wherrein the 4-pole armature is fixed with pole correspondence within a rotary ring made of 4-pole permanent magnet, the rotary shaft for the rotary ring being inserted into the center of the electromagnetic-pole core, and said back-up cores are attached at the ends of the cross-shaped core extending in the direction opposite to the rotational direction of the ring.

9. The 4-pole motor of claim 1 wherein windings are provided on only one pair of said core members.

10. The 4-pole motor of claim 1 wherein said back-up cores extend in substantially only one circumferential direction from the respective core members.

* * * * *